United States Patent Office 2,780,164
Patented Feb. 5, 1957

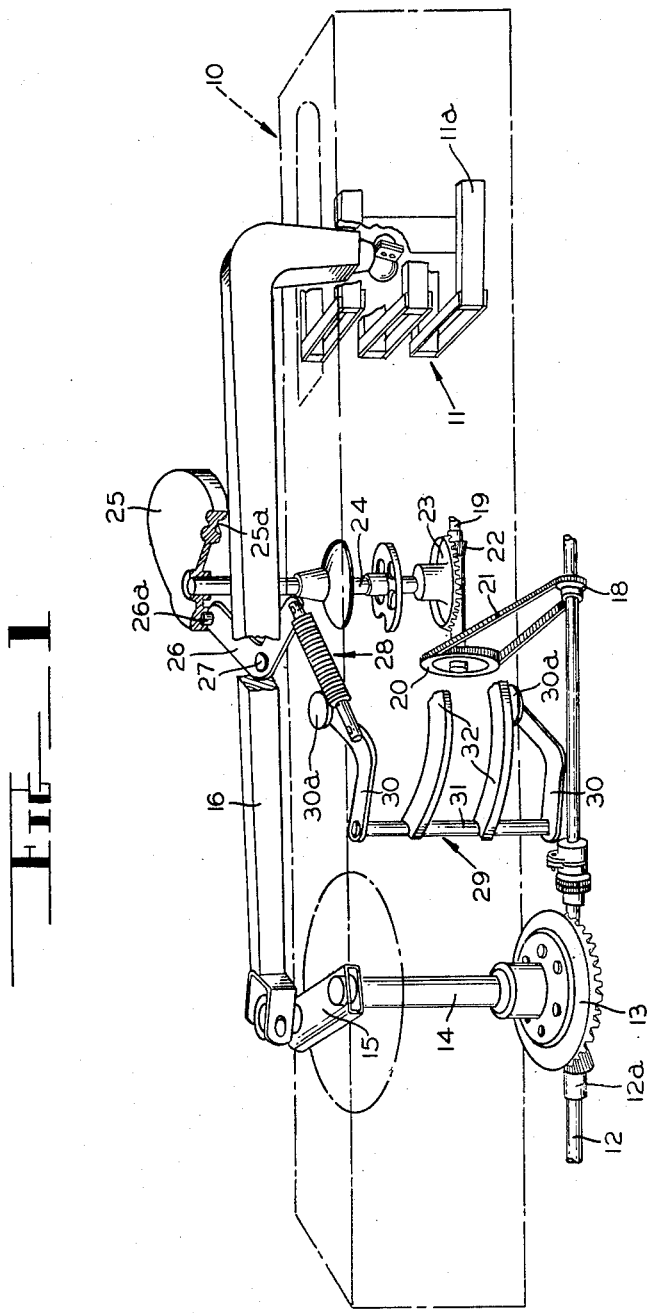

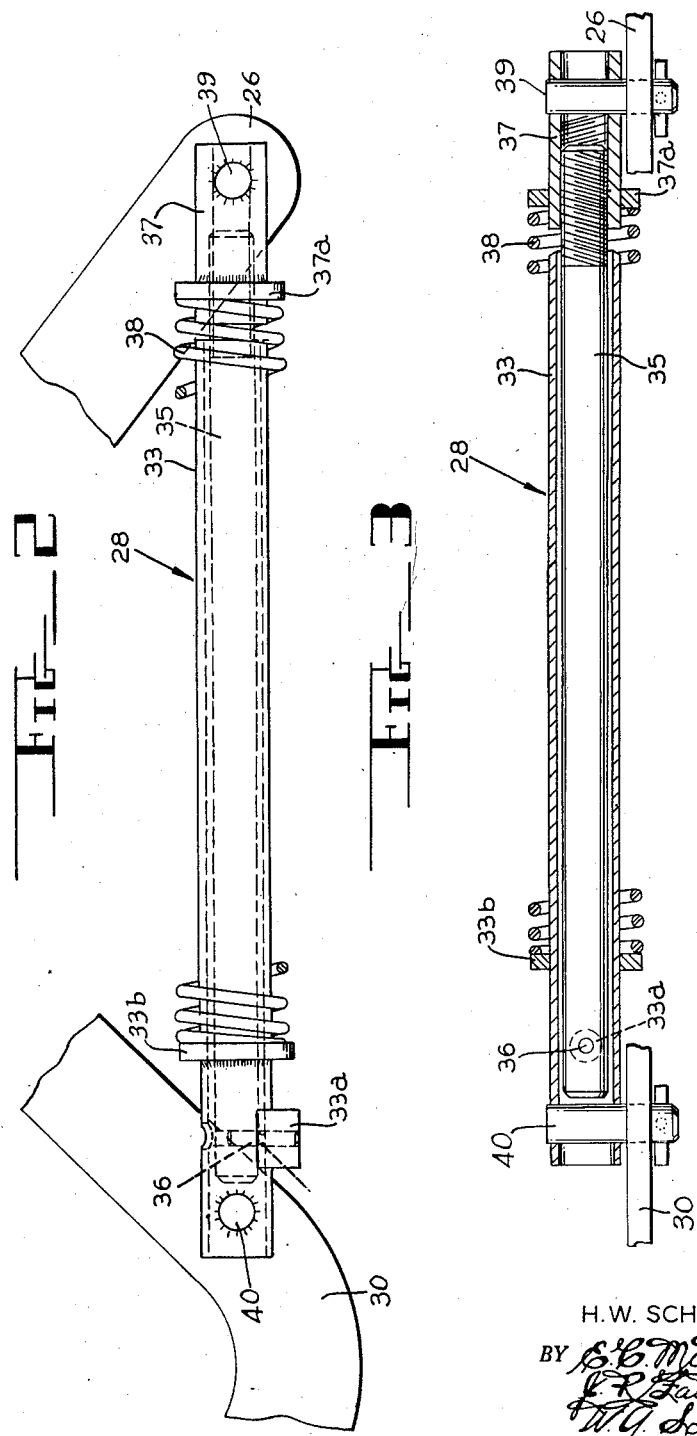

2,780,164

BALER NEEDLE SAFETY CONNECTION

Henry W. Schaaf, Lake Orion, Mich., assignor to Ford Motor Company, Dearborn, Mich., a corporation of Delaware Application October 30, 1953, Serial No. 389,207

3 Claims. (Cl. 100—19)

This invention relates to automatic baling machines. In a more specific aspect this invention relates to a safety driving connection for the needles which wrap the twine or other binding medium around the compressed bales in automatic baling machines.

Baling machines are widely employed to make bales of straw, hay and the like, for use as animal feeds, bedding and the like. Such baling machines usually include a bale chamber wherein material is compressed by a reciprocable ram, and a twine or wire carrying needle is arranged to pass through slots in a bale chamber wall and the baler ram to position the wire or twine around a compressed bale for tying by the knotting device. In many instances bending and breakage have been caused such needles when they encounter an obstruction in the path of their travel. Oftentimes, due to excess vibration of the baler caused by rough fields, the needles are misaligned with the bale chamber slots and strike the side of the bale chamber. Also the needles may get out of synchronization with the ram and strike the side of the ram head resulting in damage to the needles and often to other parts of the baling mechanism.

It is accordingly an important object of the present invention to provide a safety drive connection for baler needles. It is a further object to provide a novel safety connection for baler needles which automatically disengages the needles from the needle driving mechanism when an obstruction is encountered. It is still another object to provide a safety connection for baler needles which operates to forcibly return the needles to a safe position outside of the bale chamber in the event such needles strike an obstruction or encounter an unusual resistance in their path of travel.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a perspective view of a baler drive mechanism embodying the safety connection of the present invention.

Figure 2 is a plan view of the present baler needle safety connection.

Figure 3 is a section view taken along the plan of 3—3 of Figure 2.

As shown on the drawings:

Numeral 10 refers to the bale chamber which comprises the conventional elongated case of substantially square cross section. A ram 11 is slidably disposed within bale chamber 10 by means of wood wear blocks 11a and is adapted to be reciprocated longitudinally within the bale chamber. The main drive shaft 12 of the baler is adapted to be powered from an external source (not shown) and is fitted with a bevel gear 12a which meshes with a bevel gear 13, attached to an upstanding crank shaft 14, for driving the same. Crank shaft 14 is disposed adjacent one side and exteriorly of chamber 10, and is fitted at its upper end with a crank arm 15. Connecting rod 16 drivingly connects the crank arm 15 and the ram 11 for reciprocating movement. This construction is more specifically described in my copending application Serial No. 310,282, filed September 18, 1952.

The needle drive mechanism is indicated generally at 17 and is adapted to actuate a set of needles 32 in synchronization with the movement of the ram 11. The needle drive mechanism 17 is intermittently activated by means of a conventional gage wheel and clutch mechanism (not shown) to move the needles 32 across the bale chamber 10 at the end of every bale. The main drive shaft 12 has a sprocket 18 secured thereon. A longitudinally disposed idler shaft 19 is positioned on the opposite side of the bale chamber 10 and has a sprocket 20 secured thereto. A chain 21 drivingly connects sprockets 18 and 20 to power the idler shaft 19. Shaft 19 is fitted with a bevel gear 22 and the upstanding needle drive shaft 24 is fitted at its lower end with a bevel gear 23 which meshes with the bevel gear 22 on idler shaft 19. Needle drive shaft 24 is fitted at its upper end with a cam plate 25 which has a cam groove 25a formed therein. A bell crank 26 is pivotally mounted at 27 on top of bale chamber 10 and has an upstanding pin 26a formed on its one end which is adapted to slidably engage the cam groove 25a of cam plate 25. The needles 32 and their mounting are indicated by reference numeral 29 and comprise a pair of horizontally disposed arms 30 which are respectively pivoted to the top and bottom of bale chamber 10 by suitable pivot connections 30a. Pivots 30a are in coaxial, vertical alignment. An upstanding support rod 31 is secured between the outer ends of arms 30 and is adapted to swing in an arc about the axis of the vertically disposed pivots 30a. The needles 32 are rigidly secured to the upstanding support rod 31 and are adapted to swing through suitable slots (not shown) in the wall of the bale chamber 10 and slots in the ram 11 when the ram is positioned in contact with the hay.

The safety connection of the present invention is indicated by reference numeral 28 attached by means of straight pin 37b and cotter key 30b and is clearly shown in Figures 2 and 3. Safety connection 28 provides a connecting link between the free end of bell crank 26 and the top needle support arm 30 for driving the needles 32 into and out of bale chamber 10. Connection 28 comprises an outer tube 33 into which a rod 35 slidably telescopes. Rod 35 and outer tube 33 are provided with alignable apertures for the receipt of a shear pin 36 which normally holds said parts in an assembled operative relationship. A shear pin indexing block 33a is welded to outer tube 33 and is provided with an aperture which is coaxial with the aperture of tube 33. Block 33a is of such dimension that the neck portion or shear point 36a of pin 36 will lie in the shear plane between tube 33 and rod 35 when said pin is driven in flush with the outer surface of said indexing block.

Rod 35 has a short tube 37 threaded onto its outer end, which is of substantially the same outside diameter as tube 33. Tubes 37 and 33 are respectively fitted with thrust washers 37a and 33b, welded thereto. Washers 37a and 33b are longitudinally spaced on the assembled unit 28. A coil compression spring 38 is fitted over tubes 33 and 37 between the washers 33b and 37a. The ends of the unit 28 are fitted with pivot pins 39 and 40 whereby said unit is connected between the free end of bell crank 26 and the upper needle support arm 30.

Operation

Since the force required to shear pin 36 is greater than the force of spring 38 and the normal working force imposed on needles 32, caused by movement of the bale binding agent across bale chamber 10, the unit 28 is maintained in an assembled, operative relation by pin 36. However when the needles 32 encounter an unusual force or strike an obstruction in their path of travel, the additional pressure will cause pin 36 to be sheared. Spring 38 being under compression, then rapidly forces tube 33 and rod 35 apart, causing the needles 32 to be swung backwards and clear of bale chamber 10. Thus the safety connection 28 both drives and safeguards the needles 32 against accidental damage or breakage.

It will thus be understood that the present invention provides a novel safety connection for driving the needles of automatic baling machines. The present connection is advantageously a functional part of the machine in that it both drives the needles and serves as a safeguard for protecting the needles during their operation.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a baling machine comprising a baling chamber, having an opening in a wall thereof, a needle movable through said opening and across said chamber, and drive means for reciprocating said needle, the improvement of a safety driving connection for said needle, said connection comprising a separable link having a pair of halves respectively connected to said needle drive means and to said needle, a shear connection normally holding said link halves in an assembled relation, and means normally biasing said needle away from said bale chamber, whereby an obstruction in the path of said needle causes said shear connection to be severed and said biasing means to forceably move said halves apart and thus move said needle to a safe position outside of said bale chamber.

2. For use with an automatic baling machine having a bale chamber and a needle movable into and out of said bale chamber, and drive means for reciprocating said needle, the improvement of a safety driving connection for said needle, said connection comprising a pair of telescoping elements respectively connectable between said needle and said needle drive means, said telescoping elements being held in a normally fixed and nested relation by a shear connection therebetween, and means normally biasing said telescoping elements apart whereby, when said needles encounter an obstruction said shear connection is caused to be severed and said biasing means forceably separates said telescoping elements to move said needle to a safe portion outside of said bale chamber.

3. The needle safety driving connection defined in claim 2 wherein said shear connection includes an apertured shear pin indexing block fixedly secured to the outer of said telescoping elements with the said aperture coaxial with alignable apertures in said outer and inner telescoping elements, said indexing block being of such dimension that the necked down shear point of a shear pin will lie in the shear plane between said inner and outer telescoping elements when said pin is driven in flush with the outer surface of said index block.

References Cited in the file of this patent

UNITED STATES PATENTS

| | | |
|---|---|---|
| 1,384,270 | Murphy | July 12, 1921 |
| 1,671,966 | Burkholder | June 5, 1928 |
| 1,740,838 | Roesen | Dec. 24, 1929 |
| 2,485,001 | Kane | Oct. 18, 1949 |
| 2,512,896 | Hill et al. | June 27, 1950 |
| 2,665,128 | Guffey | Jan. 5, 1954 |